Patented Apr. 27, 1954

2,676,956

UNITED STATES PATENT OFFICE 2,676,956

DISAZO- AND POLYAZO-QUINOLINE-DYESTUFFS

Walter Anderau, Basel, Switzerland, assignor to Ciba Limited, Basel, Switzerland, a Swiss firm No Drawing. Application June 22, 1951, Serial No. 233,122

Claims priority, application Switzerland June 28, 1950

9 Claims. (Cl. 260—155)

According to this invention valuable disazo- and polyazo-dyestuffs are made by coupling a diazo compound of an amine of the formula

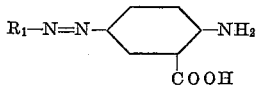

in which $R_1$ represents an 8-hydroxyquinoline radical bound in the 5-position to the azo group, with a 1-hydroxynaphthalene-3-sulfonic acid which contains in the β-position of the 6-membered ring of the naphthalene nucleus not containing the hydroxyl and sulfonic acid groups an amino group, preferably a substituted amino group.

The diazo components of the above formula can be made by coupling diazotized 5-amino-2-nitrobenzene-1-carboxylic acid or 5-amino-2-acylaminobenzene-1-carboxylic acid with an 8-hydroxyquinoline capable of coupling in the 5-position, and reducing in the resulting monoazo-dyestuff the nitro-group to an amino group or hydrolyzing the acylamino group. As 8-hydroxy-quinolines capable of coupling in the 5-position, there come into consideration, for example, 8-hydroxyquinoline-7-sulfonic acid and above all 8-hydroxyquinoline itself. The coupling is advantageously conducted in an alkaline medium, for example, a medium rendered alkaline with ammonia. The reduction of the nitro group to an amino group is carried out under conditions such that the azo group is not attacked, for example, in an alkaline medium by means of an alkali metal sulfide or an ammonium sulfide at a moderately raised temperature. The hydrolysis of the acyl amino group is advantageously carried out by heating the product in a dilute solution of an alkali metal hydroxide.

As coupling components there are used in the present process 1-hydroxynaphthalene-3-sulfonic acids which contain in the 6-membered ring of the naphthalene nucleus not containing the hydroxyl and sulfonic acid groups in a β-position, thus in the 6- or 7-position, an amino group. As examples there may be mentioned 1-hydroxy-7-aminonaphthalene-3-sulfonic acid (more usually named 2 - amino - 8 - hydroxynaphthalene - 6-sulfonic acid) and especially 1-hydroxy-6-amino-naphthalene-3-sulfonic acid (more usually named 2 - amino - 5 - hydroxynaphthalene - 7 - sulfonic acid), and advantageously substitution products thereof.

When the coupling is carried out with 2-amino-5-hydroxynaphthalene-7-sulfonic acid itself the coupling may be carried out in an acid or alkaline medium, the diazo compound, as is known, entering the 1-position of the azo component in the case of acid coupling and the 6-position in the case of alkaline coupling. When the coupling occurs in the 1-position valuable intermediate dyestuffs are obtained, which may with advantage be converted into polyazo-dyestuffs by coupling them in an alkaline medium with a further diazo compound, such, for example, as a diazotized 4-amino - 4' - hydroxy - 1:1' - azobenzene - 3'-carboxylic acid (which may, if desired, contain further substituents).

In the case of the disazo dyestuffs, which are formed by coupling diazo compounds of the aforesaid constitution with 2-amino-5-hydroxynaph-thalene-7-sulfonic acid in an alkaline medium, it is of advantage to carry out further reactions at the —NH₂ group, for example, by further diazotizing these compounds and coupling them with suitable azo components or by reacting them with acylating agents such, for example, as acid halides, with phosgene or with heterocyclic compounds containing reactive halogen atoms such as cyanuric chloride or dichloroquinazoline. When reactions are carried out with the latter compounds containing more than one reactive halogen atom, these compounds can advantageously be used to serve for the condensation of the resulting disazo-dyestuffs with further amino-azo dyestuffs of the same or a different kind to form polyazo-dyestuffs.

Very valuable polyazo dyestuffs are obtained by coupling diazo compounds of the foregoing constitution in an alkaline medium with substitution products of 2-amino-5-hydroxynaphtha-lene-7-sulfonic acid. As substitution products there come into consideration, for example, azo dyestuffs which have been obtained by coupling the aforesaid acid with a diazo compound in an acid medium. Especially valuable are the disazo- and polyazo dyestuffs obtainable by the present process from N-substitution products of 2-amino-5-hydroxynaphthalene sulfonic acid. Such N-substitution products may be, for example, 2-arylamino - 5 - hydroxynaphthalene - 7 - sulfonic acids or 2-acylamino-5-hydroxynaphthalene-7-sulfonic acids. In this connection there may also be used compounds capable of coupling twice such, for example, as 5:5'-dihydroxy-2:2'-di-naphthylamine-7:7'-disulfonic acid, 5:5'-dihy-droxy-2:2'-dinaphthylurea-7:7'-disulfonic acid or compounds obtainable by condensing two molecular proportions of 2 amino-5-hydroxynaph-thalene-7-sulfonic acid with one molecular proportion of cyanuric chloride. Such azo components capable of coupling twice may be coupled on one side or on both sides with diazo compounds of the foregoing constitution. If desired, the coupling may be carried out on one side with a diazo compound of that kind and one the other side with any desired diazo compound, for example with a diazo-compound of an amino monoazo dyestuff of the formula $$H_2N—R_4—N=N—R_5$$

wherein $R_4$ stands for a benzene radical containing the azo group in para-position to the amino group and containing in ortho-position to the amino group a substituent capable of taking part in the formation of metal complexes such as a lower alkoxy, for example, a methoxy group or a carboxylic acid, and $R_5$ stands for a radical of a 1-hydroxybenzene-2-carboxylic acid bound to the azo group in its 4-position or an 8-hydroxyquinoline bound to the azo group in its 5-position.

For this purpose the following compounds may be used: 2 - methyl - 4 - amino - 5 - methoxy-4' - hydroxy - 1:1' - azobenzene - 3' - carboxylic acid, 4 - amino - 4' - hydroxy - 1:1' - azobenzene - 3,3' - dicarboxylic acid.

Valuable dyestuffs can also be obtained by coupling diazo compounds of the foregoing constitution with N-substitution products of 2-amino - 8 - hydroxynaphthalene - 6 - sulphonic acid, among which there may be mentioned as examples the following N-substitution products: 2 - phenylamino - 8 - hydroxynaphthalene - 6-sulfonic acid, 2-benzoylamino-8-hydroxynaphthalene-6-sulfonic acid, and 8:8'-dihydroxy-2:2'-dinaphthylamine-6:6'-disulfonic acid.

The compounds of the formula

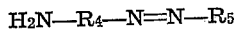

are advantageously diazotized by the so-called indirect method, for example, by mixing an aqueous weakly alkaline solution of an alkali salt of the compound in question, which contains the necessary quantity of nitrite, with an excess of hydrochloric acid.

The latter diazo compounds may be coupled with 2-amino-5-hydroxynaphthalene-7-sulfonic acid or a substitution product thereof or with N-substitution products of 2-amino-8-hydroxynaphthalene-6-sulfonic acid by the customary known methods for coupling with such azo components.

The new disazo- and polyazo-dyestuffs obtainable by the present process correspond to the general formula

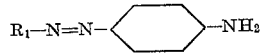

in which $R_1$ represents an 8-hydroxyquinoline radical bound in the 5-position to the azo group and $R_2$ represents the radical of a 1-hydroxynaphthalene-3-sulfonic acid which contains in a β-position of the 6-membered ring of the naphthalene nucleus not containing the hydroxyl and sulfonic acid groups an amino group, preferably a substituted amino group.

These dyestuffs are suitable for dyeing a very wide variety of materials, for example, animal fibers such as wool, silk and leather. The dyestuffs obtainable from 2-amino-5-hydroxynaphthalene-7-sulfonic acid or substitution products thereof are very well suited for dyeing and printing cellulose materials such as cotton, linen and artificial silk and stable fibers of regenerated cellulose. The dyestuffs may with advantage be treated on the fiber or partially on the fiber and partially in the dyebath with agents yielding metal by known methods. It is of advantage, for example, to use the process of U. S. Patent No. 2,148,659 in which first the dyeing and then the treatment with an agent yielding metal are carried out in the same bath. In this connection there come into consideration as agents yielding metal preferably those which are stable towards alkaline solutions, such as complex copper tartrates and the like.

In some cases especially valuable dyeings can be obtained by working according to the process in which a dyeing or printing produced with the metal-free dyestuff is after-treated with an aqueous solution containing a basic condensation product of formaldehyde with a compound which contains at least once the atomic grouping

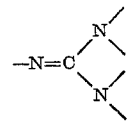

for example, dicyandiamide or dicyandiamidine, or which can easily be converted into such a compound, for example, cyanamide, and which solution also contains a water-soluble copper compound, and especially a water-soluble complex copper compound. Such a process is described, for example, in British Patent No. 619,969.

The following examples illustrate the invention, the parts and percentages being by weight:

*Example 1*

A moist paste corresponding to 30.8 parts of the aminoazo-dyestuff of the formula

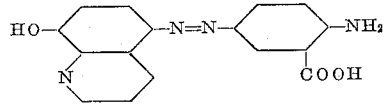

are dissolved in the form of an alkali salt in 500 parts of water, then mixed with 7 parts of sodium nitrite and, after the addition of ice, acidified with 32 parts of concentrated hydrochloric acid. After a few minutes the diazotization comes to an end. The diazo compound is run into an ice-cold solution of 32 parts of 2-phenylamino-5-hydroxynaphthalene-7-sulfonic acid and 50 parts of anhydrous sodium carbonate in 400 parts of water, and the whole is stirred for a few hours and heated up to 65° C. The disazo dyestuff of the formula

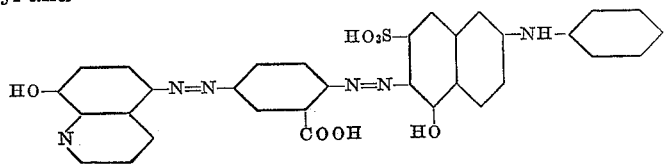

is completely precipitated with sodium chloride. It is separated by filtration and dried. It is obtained in the form of a dark powder which is soluble in water with a reddish blue coloration and dyes fibers of natural cellulose and fibers of regenerated cellulose from a bath containing sodium sulfate violet tints which change to reddish blue dyeings of very good fastness to light and washing when treated with a copper salt.

Instead of 2-phenylamino-5-hydroxynaphthalene-7-sulfonic acid there may be used 35 parts of 2-(4'-methoxy)-phenylamino-5-hydroxynaphthalene-7-sulfonic acid. The dyestuff so obtained corresponds to the formula

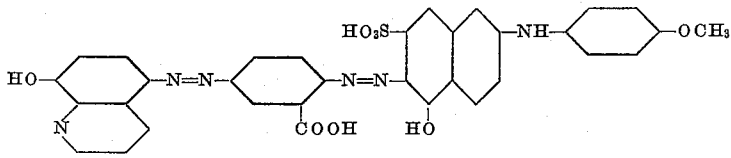

and yields in the presence of a copper salt a brighter reddish blue dyeing.

By using instead of 2-phenylamino-5-hydroxynaphthalene-7-sulfonic acid the isomeric 2-phenylamino-8-hydroxynaphthalene-6-sulfonic acid, there is obtained a dyestuff which corresponds to the formula

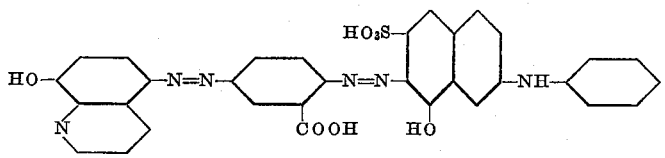

and dyes cellulose fibers by the single bath or 2-bath after-coppering process grey-blue tints.

By using instead of 2-phenylamino-5-hydroxynaphthalene-7-sulfonic acid an equivalent quantity of 2-(4'-acetylaminobenzoyl)-amino-5-hydroxynaphthalene-7-sulfonic acid, there is obtained a dyestuff which corresponds to the formula

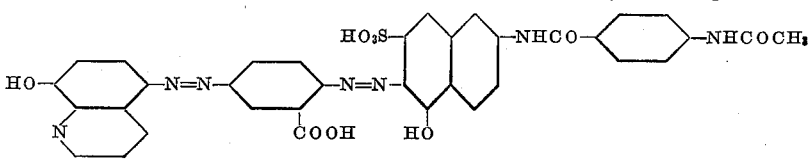

and yields on cellulose fibers when after-coppered blackish-blue dyeings.

The amino-monoazo-dyestuff used as starting material in this example may be prepared as follows: 18.2 parts of 5-amino-2-nitrobenzene-1-carboxylic acid are dissolved with 5.5 parts of anhydrous sodium carbonate in 200 parts of water, and the whole is acidified with 35 parts of hydrochloric acid of 30 per cent. strength and diazotized in known manner with 7 parts of sodium nitrite. The diazo compound is run into an ice-cold solution of 14.5 parts of 8-hydroxyquinoline, 30 parts of ammonia solution of 25 per cent. strength and 200 parts of water. Dyestuff formation occurs immediately, and after 2 hours the reduction of the nitro group is commenced by heating the whole up to 45–50° C., adding in portions a solution of 38 parts of crystalline sodium sulfide in 100 parts of water, and stirring for 1½–2 hours. When no more sodium sulfide is taken up, the aminoazo-dyestuff is precipitated by the addition of sodium chloride, separated by filtration and the moist paste so obtained is advantageously used for the further synthesis.

The same aminoazo dyestuff can be obtained by coupling 2-acetylamino-5-aminobenzene-1-carboxylic acid in an alkaline medium with 8-hydroxyquinoline, and then splitting off the acetyl group by prolonged heating of the dyestuff solution with sodium hydroxide solution of 5 per cent. strength.

Example 2

23.9 parts of 2-amino-5-hydroxynaphthalene-7-sulfonic acid in the form of a freshly precipitated suspension are coupled in a medium rendered weakly acid with acetic acid with the diazo compound obtained as described in Example 1 from 30.8 parts of the aminoazo dyestuff of the formula

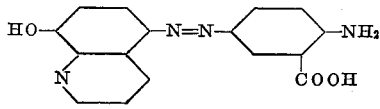

Coupling comes to an end after several hours, and then a sufficient quantity of sodium carbonate is added to produce an alkaline reaction, and the dystuff is precipitated by the addition of sodium chloride and separated by filtration. The disazo dyestuff is redissolved in warm water and the solution is cooled with ice to 4° C.

30.1 parts of the monoazo dyestuff, obtained by coupling the diazo compound from 15.3 parts of 4-amino-1-hydroxybenzene-2-carboxylic acid in an acid medium with 13.7 parts of 1-amino-2-methoxy-5-methylbenzene, are diazotized in known manner and then coupled with the alkaline solution of the disazo dyestuff obtained as described above. After 6 hours the whole is heated to 60–70° C., the tetrakisazo dyestuff is completely precipitated by means of sodium chloride, separated by filtration and dried. There is obtained a dark powder which dissolves in water with a blue coloration and dyes fibers of natural cellulose and fibers of regenerated cellulose from a bath containing sodium sulfate navy blue tints which when after-treated with a nickel or copper salt in the same or a fresh bath yield dyeings which are fast to light and washing.

Example 3

The diazo compound obtained as described in Example 1 from 30.8 parts of the aminoazo dyestuff described therein is coupled in the presence of sodium bicarbonate at 0–4° C. with 46.1 parts of 5:5'-dihydroxy-2:2'-dinaphthylamine-7:7'-disulfonic acid. 15 parts of anhydrous sodium carbonate are then added, and there is added the diazo compound obtained from 30.1 parts of the monoazo-dyestuff obtained by coupling the diazo compound from 15.3 parts of 4-amino-1-hydroxy-benzene-2-carboxylic acid in an acid medium with 13.7 parts of 1-amino-2-methoxy-5-methyl-benzene. After a few hours the whole is heated to 70° C. and the dyestuff of the formula C. The whole is then allowed to cool to about 70° C., and the cotton so dyed a blue-violet tint is after-treated in the manner described in any one of the following paragraphs:

(a) The dyeing is rinsed in cold water and treated for ½ hour at 50° C. in a bath containing 4000 parts of water, 3 parts of crystalline copper

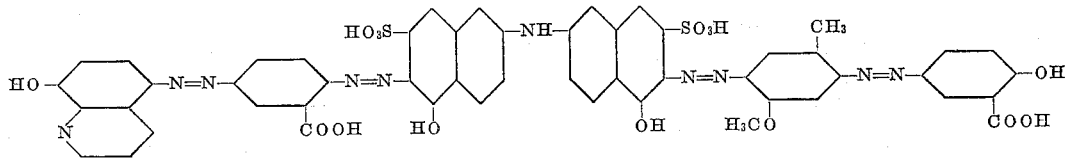

is completely precipitated by means of sodium chloride, separated by filtration and dried. It is a dark powder which dissolves in water with a blue coloration and dyes fibers of natural cellulose and fibers of regenerated cellulose reddish blue tints which when after-treated with a copper salt change to blue dyeings which are fast to light and washing.

A similar tetrakisazo-dyestuff which corresponds to the formula sulfate and 1 part of acetic acid. The material is then rinsed and dried. A reddish blue dyeing of good fastness to light and having very good properties of wet fastness is obtained.

(b) To the dyebath, which has been cooled to about 70° C., are added 4 parts of complex copper sodium tartrate of approximately neutral reaction, coppering is carried on for ½ hour at about 80° C. and the dyeing is rinsed with cold water. If desired the dyeing may be soaped by

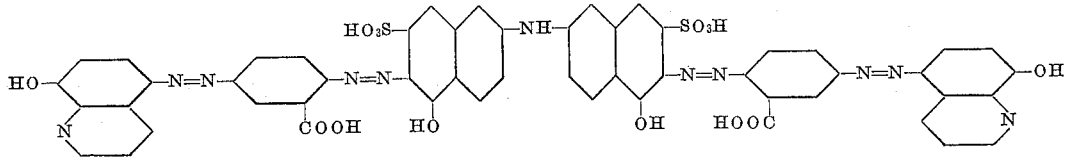

is obtained by coupling the diazo compound of 61.6 parts of the aminoazo dyestuff described in Example 1 with 46.1 parts of 5:5′-dihydroxy-2:2′-dinaphthyl-amine-7:7′-disulfonic acid in the presence of 35 parts of anhydrous sodium carbonate.

By using in the procedure described in the last paragraph, instead of 5:5′-dihydroxy-2:2′-dinaphthylamine-7:7′-disulfonic acid, an equivalent quantity of 5:5′-dihydroxy-2:2′-dinaphthyl-urea-7:7′-disulfonic acid with the diazo compound from 61.6 parts of the aforesaid amino monoazo dyestuff, there is obtained a tetrakisazo dyestuff which dyes cellulose fibers violet-grey tints when after-coppered by the single bath or 2-bath process.

From 61.6 parts of the diazotized aminoazo dyestuff according to Example 1 and 46.1 parts of 8:8′-dihydroxy-2:2′-dinaphthylamine-6:6′-disulfonic acid there is obtained a tetrakisazo dyestuff which also dyes cotton violet-grey tints by the single bath or 2-bath after-coppering process.

after-treatment for ½ hour in a bath containing, per liter of water, 5 grams of Marseilles soap and 2 grams of anhydrous sodium carbonate. A reddish blue dyeing is obtained of good fastness to light and having good properties of wet fastness.

(c) The dyeing is rinsed with cold water and then after-treated for ½ hour at 20° C. in a solution prepared by dissolving 4.5 parts of a water-soluble condensation product of dicyandiamidine and formaldehyde, 1.5 parts of copper acetate and 6 parts of a concentrated aqueous solution of ammonia in 3000 parts of water, and adding 2 parts of anhydrous sodium carbonate to the solution containing cupric tetramine acetate. The material is then rinsed and dried. A reddish blue dyeing is obtained which is distinguished by good fastness to light and very good properties of wet fastness.

What is claimed is:

1. An azo dyestuff which corresponds to the formula

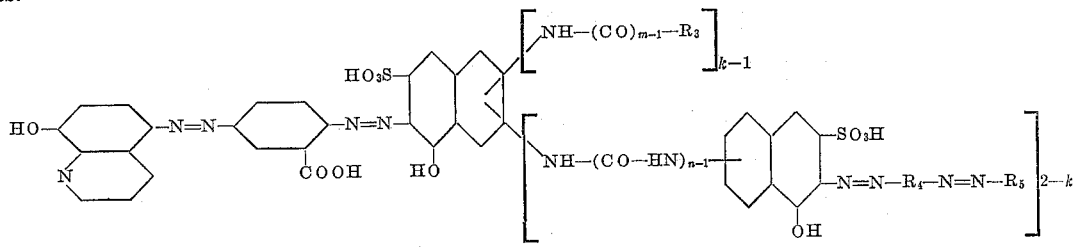

*Example 4*

100 parts of cotton are entered at 50° C. into a dyebath consisting of 400 parts of water, 2 parts of anhydrous sodium carbonate and 2 parts of the dyestuff obtainable as described in the first paragraph of Example 1. The temperature is raised to 90–95° C. in the course of 20 minutes, 30 parts of crystalline sodium sulfate are added, and dyeing is carried on for 30 minutes at 90–100° in which the —NH-groups are bound in β-position to the naphthalene nuclei, $k$, $m$ and $n$ each represents a whole number of at the most 2, $R_3$ stands for a benzene radical, $R_4$ stands for a benzene radical containing the azo groups in para-position to one another and containing in ortho-position to the azo group connecting $R_4$ with the naphthalene nucleus a substituent selected from the group consisting of a methoxy group and a carboxylic acid group, and $R_5$ stands for a member selected from the group consisting of a radical of a 1-hydroxybenzene-2-carboxylic acid

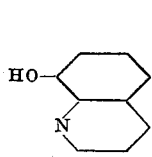

bound to the azo group in 4-position and the radical of the formula

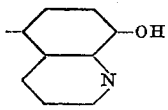

2. An azo dyestuff which corresponds to the formula

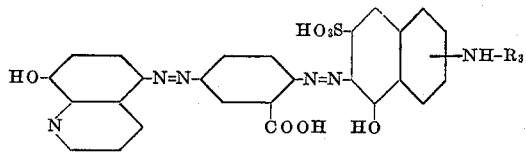

in which $R_3$ represents a benzene radical and the radical —NH—$R_3$ is bound to the naphthalene nucleus in a β-position.

3. An azo dyestuff which corresponds to the formula

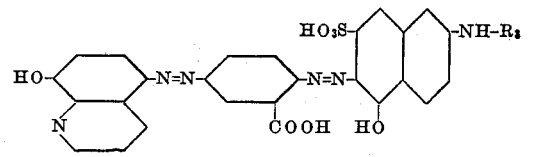

in which $R_3$ represents a benzene radical.

4. An azo dyestuff which corresponds to the formula

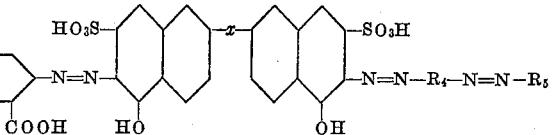

in which $x$ represents a member of the group consisting of the radicals —NH— and

—NH—CO—HN—

$R_4$ stands for a benzene radical containing the azo groups in para-position to one another and containing in ortho-position to the azo group connecting $R_4$ with the naphthalene nucleus a substituent selected from the group consisting of a methoxy group and a carboxylic acid group, and $R_5$ stands for a member selected from the group consisting of a radical of a 1-hydroxybenzene-2-carboxylic acid bound to the azo group in 4-position and the radical of the formula

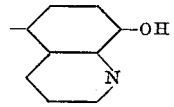

5. The azo dyestuff which corresponds to the formula

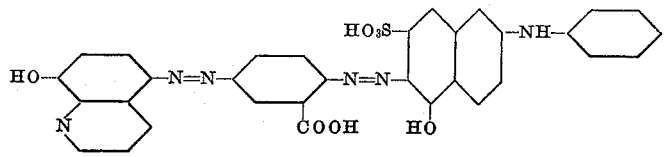

6. The azo dyestuff which corresponds to the formula

7. The azo dyestuff which corresponds to the formula

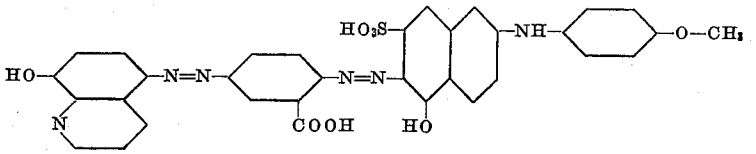

8. The azo dyestuff which corresponds to the formula

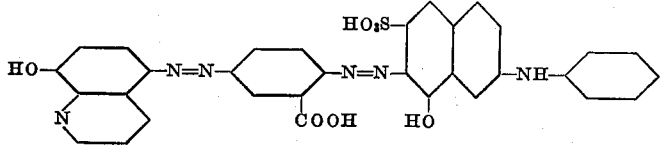

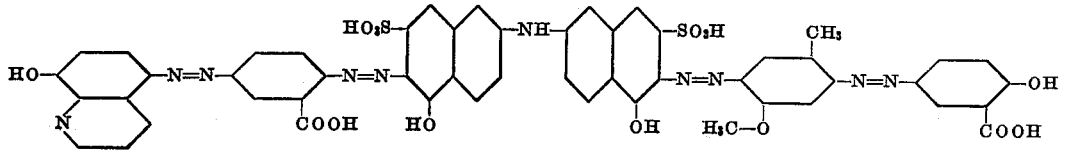

9. The azo dyestuff which corresponds to the formula

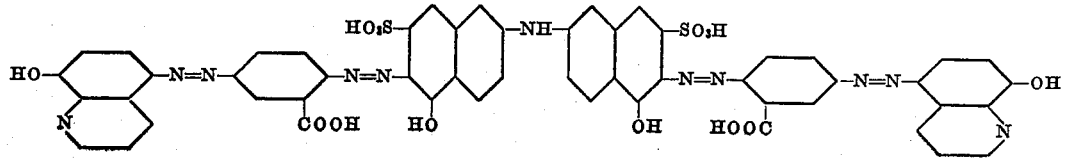

No references cited.